United States Patent Office 3,606,683
Patented Sept. 21, 1971

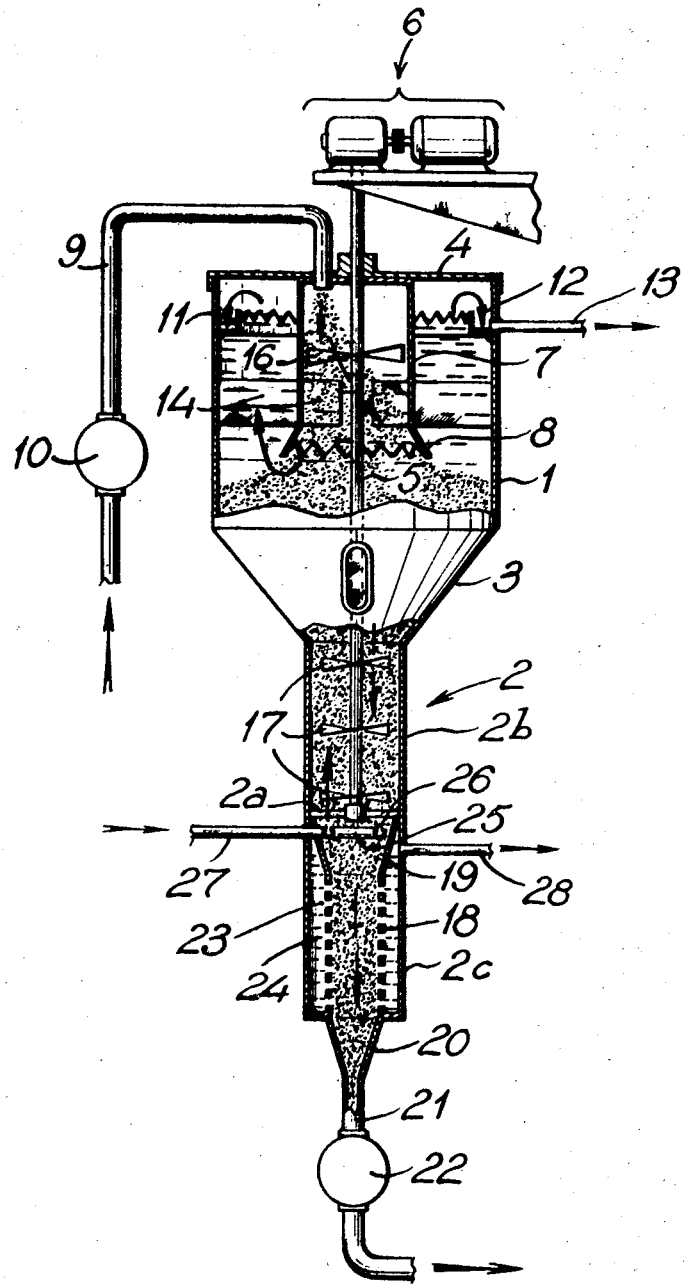

3,606,683
METHOD AND APPARATUS FOR CONTINUOUSLY SEPARATING CURD AND WHEY
Jean-Louis Fernand Joux, Epinay-sur-Seine, and Maurice Blanchet, Champigny-sur-Marne, France, assignors to Fromageries Bel-La Vache Qui Rit, Paris, Seine, France
Filed Mar. 12, 1968, Ser. No. 712,541
Claims priority, application France, Mar. 15, 1967, 98,867
Int. Cl. A01j 25/00, 25/11; A23c 19/02
U.S. Cl. 31—46
4 Claims

ABSTRACT OF THE DISCLOSURE

A mixture of curd and whey is continuously introduced into a decanting zone at the top of a vertical vessel. The mixture passes downward through an axial diffusing zone and whey is decanted near the top of the vessel. The curd continues downward in the vessel and enters a vertical pressing zone having a perforated wall for separation of whey remaining with the curd, and the curd is continuously extracted at the bottom of the pressing zone. A vertical washing zone may be positioned between the decanting zone and the pressing zone.

---

The present invention relates to a method and apparatus for continuously separating and washing curds resulting from the coagulation of milk, in accordance with which the coagulated milk is continuously fed at adjustable temperature into a decanting vessel inside which the whey and the curds are caused to separate by taking advantage of the difference in density between the two phases, following which the curds are fed continuously in grain form into a washing vessel within which they are counter-current with a washing solution.

The present invention relates to a method whereby, starting with milk which has been coagulated or processed in such manner that it takes the form of a mixture of curd grains and whey of substantially different densities, it is possible to continuously obtain, on the one hand, whey virtually free of all the cheese-making substances or the casein and, on the other hand, cheese or casein-making curds which contain no more than a small proportion of mechanically entrained water, washing solution and whey and which are washed so that their content of soluble ingredients is brought to a level appropriate to the specific type of cheese or casein to be manufactured.

It is accordingly an object of this invention to provide a method of separating and washing a mixture comprising a serum and a coagulum of substantially different densities consisting in the steps of continuously feeding the mixture, continuously separating the coagulum and the serum by decantation, continuously washing the coagulum in counter-current with a washing solution, and continuously collected at a point of exit from the decanting process, on the one hand, and the coagulum issuing from the washing process, on the other.

In a preferred embodiment of the invention directed to cheese or casein-making curds, the mixture of whey and curd grains is introduced continuously into a decanting vessel inside which the two constituents of the mixture separate under gravity, the curd grains being conveyed into a washing vessel inside which water or a washing solution is introduced so that it is passed in counter-current with the curd grains. The whey is continuously collected at a point of exit from the decanting vessel and the washed curds are extracted continuously from the washing column.

In the conventional cheesemaking technique, the curd is separated from the whey either by ordinary draining, or by draining combined with a pressing in moulds of the milk coagulated in a cheesemaking vat, as is customary for manufacturing cottage cheese or soft cheese; alternatively, the curd is separated from the whey, after the curd has been sliced in a cheesemaking vat followed by more or less extensive mechanical and thermal working, by a decanting and extraction of the whey, as is customary when manufacturing pressed cheese or cooked cheese.

In the former case, it is not usual to effect a washing, either because this is unnecessary or because the techniques employed would result in great difficulties being encountered. In the latter case, in which separation takes place in the vat, the curd often undergoes, after elimination of a so-called "first whey," one or more washings with water followed, in each case, by elimination of the aqueous phase by decanting and extraction of the whey. The manufacture of casein is generally based on the latter-mentioned method and often requires repeated washings to ensure exhaustive elimination of the milk.

In all these cases the operations are discontinuous and have very serious disadvantages. The first of these disadvantages resides in the non-uniformity of the manufactured product as regards quality, composition and weight, owing to the difficulty, if not impossibility, of checking and adjusting with sufficient accuracy all the parameters governing the characteristics of the product, having regard for the variable nature of the raw material represented by milk. A second disadvantage is the low efficiency of the various separating and washing operations, resulting not only in high operating costs but also in large losses of cheesemaking material, and, when washing is necessary, in a substantial dilution of the whey which entails extra cost in the manufacture of milk powders.

Recourse has already been had to methods of continously separating curds from coagulated milk which fundamentally involve passing the mixture over a sifter through which the whey is eliminated. In other prior art continuous methods, separation is effected by centrifuging.

Although these prior art methods represent a step forward in efficient manufacture by virtue of the continuity they involve, either their scope of application is specifically defined or their putting into effect is likely to increase some of the drawbacks of conventional non-continuous methods, either because certain parameters—chiefly the temperature—are even more difficult to monitor than in a standard vat, or because such methods result in air inclusions in the paste.

Separation of the whey in a static continuous decanting apparatus according to the invention enable retention in the curd, of the fine solid particles that are usually lost in the whey in conventional processes, thereby ensuring a notably improved cheese yield. Counter-current washing a vessel in accordance with this invention, is performed on divided curds without intermediate operations of separating and remixing the cured with the whey or the wash solution, or both, thereby making this operation efficient and readily controllable while at the same time reducing dilution of the whey by the water or the wash solution to a minimum.

Continuous separation of the curd and the whey, supplemented if necessary by a washing of the curd in the same apparatus, makes it particularly easy to correlate these operations with continuous coagulating means positioned at an upstream location and capable of producing curds in the form of grains in suspension in the whey, and also with curd processing means such as continuous and automatic moulding means positioned in a downstream location. It is thus possible to use separating and washing apparatus according to the present invention as the nucleus for building up complete continuous processing lines for manufacturing unripened cheeses or casein, such processing lines being characterized by their simplicity, their compactness and the small amount of cheese making material retained and by the fact that they can be started up, monitored in operation, stopped and cleaned with a small number of personnel, particularly since such production lines can be extensively automated.

It is to be noted that the subject method of this invention is applicable to the manufacture of greatly differing cheeses and casein provided that there is a difference in density between the curds and the whey. This difference in density can be calculated before hand and depends on the concentration of dry matter in the whey obtained on exit from the column, and on the dry matter content and the fat to dry matter ratio of the curds. Generally speaking, it may be stated that the curds represent the heavy phase when the ratio of fat to dry matter varies between 0% and 55% and the light phase when this ratio is over 65%. Though less easy to apply when this ratio in the cheese lies between 55% and 65%, the subject method of the present invention can nonetheless be carried into practice. In such cases, one possibility is to create a sufficient difference in density between the constituents of the mixture by modifying the dry matter content of the whey or by processing curds with a fat to dry matter ratio of under 55% or over 65% and then adjusting the composition by mixing the curd obtained either with cream or fat, or with a low fat curd.

Another object of the present invention is to provide apparatus for carrying a method of the kind hereinbefore disclosed into practice, comprising, on the one hand, at least one decanting vessel having a mixture inlet, a whey outlet and a coagulum outlet (of which one is positioned at the top and the other at the bottom) and, on the other hand, at least one counter-current washing vessel having a coagulum inlet connected to the coagulum outlet of the decanting vessel, a washing solution inlet remote from the coagulum inlet, and respective outlets for the washed coagulum and the washing solution.

Preferably, this apparatus includes agitator mechanisms along the path of the mixture and the coagulum and it may further include means for heating the feeding mixture, means for heating the washing solution, and means for adjusting these heating means.

For processing coagulated milk, the subject apparatus of this invention comprises at least one preferably cylindrical decanting vessel into which is continuously introduced the mixture of curd grains and whey and from which is continuously extracted the whey that has separated from the curd grains therein under the action of gravity. In normal operation this vessel is filled with whey. When the curd requires washing, the decanting vessel is extended by a preferrably cylindrical washing column which in normal operation is likewise filled with whey. The curd grains from the decanting vessel which penetrate into the washing column through one of its ends are subjected to counterflow with water or a washing solution admitted through its other end. The curd grains gather at this other end, from which they can be continuously extracted.

The description which follows with reference to the accompanying non-limitative exemplary drawing will give a clear understanding of how the invention can be carried into practice.

The single figure in the accompanying drawing shows schematically in fragmental diametrical section an apparatus according to the invention for use in the case of a mixture of which the curd constitutes the heavy phase.

This apparatus comprises a cylindrical decanting vessel 1 and a cylindrical column 2 of substantially smaller diameter. The vessel 1 and the column 2 are coaxial, with the latter beneath the former, and the two are interconnected by a housing 3. The column further includes, on opposite sides of a level 2a, an upper cleansing portion 2b and a lower compression portion 2c.

The vessel 1 is surmounted by a cover 4 through which passes a rotating axial shaft 5 extending down to the level 2a in column 2. This shaft is driven from outside the vessel by a motor/variator unit 6. Dependent from the cover 4 is an internal, cylindrical and coaxial distribution diffuser 7 the bottom of which is formed with a flared sawtooth portion 8. A coagulated milk feed pipe 9 incorporating a pump 10 passes through the top of the cover 4 and the diffuser 7.

An L-section ring with a sawtooth edge 11 is fixed to the wall of the vessel at its upper end so as to form an overflow device or annular trough 12, and a serum outlet pipe 13 is positioned at the same level as trough 12. Flat, vertical and radial anti-swirl baffles 14 are positioned at the level of the base of the diffuser, within the latter and within the vessel. An agitator device is provided in the form of four impellers carried on shaft 5, of which one, designated by reference numeral 16, is positioned within the diffuser, and the other three, bearing reference numeral 17, are in the column.

A cylindrical tube 18 of smaller diameter is positioned coaxially in the column, below the level 2a, at which location it joins the column via a convergent section 19. The tube 18 has its lower end opening at the bottom end-section of column 2, where it is connected via second convergent section 20 to a curd outlet pipe 21 incorporating a pump 22. The tube 18 has a perforate wall with holes 23 of smaller diameter than the curd grains and, together with the column walls 2c forms an annular chamber 24.

A horizontal tubular distribution ring 25 formed with upper holes 26 is positioned within convergent section 19 and is connected to a washing solution feed pipe 27. A whey discharge pipe 28 is fixed to the column wall at the same level.

The operation of the apparatus hereinbefore disclosed is as follows:

The coagulated milk or raw mixture of curd grains and whey is introduced by the pump 10 into the diffuser 7. The curd grains and the whey separate in the vessel owing to their different densities. The whey, free from any notable quantity of fat in suspension, overflows into trough 12 and is discharged through outlet pipe 13.

The curd grains drop through washing column 2 which, through pipe 27 and distribution ring 25, receives at its lower end wash water at a rate required to obtain the desired degree of elimination of soluble substances.

The efficacy with which these soluble substances are extracted is improved by the agitator device, of which the impellers 17 rotate at a relatively slow speed adjustable between 20 and 200 revolutions per minute. These impellers improve the contact between the curd grains and the wash solution or water and, in some cases, prevent premature re-agglomeration of the curd grains; the impeller 16, moreover, breaks up and re-disperses any aggregates of curd that might tend to form, whereby a mixture is obtained in which the grains are well separated. The baffles 14 prevent fine curd particles from being carried along by the whey and prevent any swirling that could impair complete separation of the two constituents.

The curd grains, washed and free of the major part of the aqueous phase, collect at the bottom of the washing column. They are compressed within perforated tube 18, then advanced by the pump 22. The whey which drains through the holes 23 is collected in annular chamber 24 and discharged through outlet pipe 28. Alternatively, instead of being advanced by pump 22, the pressed curd could be extracted by a screw conveyor, for example, or be collected in moulds.

The apparatus according to the present invention also includes means for checking and adjusting the flow rates of the mixture as effected by pump 10, the flow rate of the outgoing curd is effected by pump 22, and the rate of feed of wash water in pipe 27. The throughput of pump 22, in particular, is adjusted so as to maintain the curd level at the base of the washing column. The temperatures of the mixture admitted through pipe 9 and of the wash water admitted through pipe 27 are likewise verifiable and adjustable, as is also the rotation speed of shaft 5 carrying the agitator device.

It goes without saying that many changes and substitutions of parts may be made without departing from the scope of the invention. Most notably, if the curd constitutes the light phase of the mixture, the cleansing column must be positioned above the decanting vessel.

What we claim is:

1. A process for the separation of a mixture of whey and cheese curd grains, the density of the grains being higher than that of the whey, said process comprising successively continuously conveying said mixture in a direction from top to bottom in an axial diffusing zone, decanting said mixture in an axial decanting zone so that a portion of the whey travels from bottom to top of a lateral extracting zone and the curd grains partially separated from the whey continuously along a path from top to bottom in a pressing zone, directing the remainder of the whey laterally through a perforated wall and the curd grains toward the bottom of the pressing zone, and continuously extracting the curd grains at the bottom of the pressing zone.

2. A process according to claim 1, further comprising prior to directing the curd grains continuously through said pressing zone, directing the curd grains partially separated from the whey continuously along a path from top to bottom through a countercurrent washing zone, and continuously agitating said curd grains partially separated from the whey.

3. Apparatus for the separation of a mixture of whey and cheese curd grains, the density of the grains being higher than that of the whey, said apparatus comprising in series, pumping means for pumping the mixture, a vertical decanting drum including an upper and lower portion, a vertically disposed diffuser supported in the upper portion of said decanting drum, said diffuser including an upper portion, a whey discharge conduit communicating with said upper portion of said decanting drum externally of said diffuser, conduit means communicating said pumping means with said upper portion of said diffuser, a vertical pressing column including a lower portion and an upper portion supporting coaxially said lower portion of said decanting drum, a perforated vertical cylindrical tube supported internally of said pressing column and defining an annular clearance therebetween, further pumping means for pumping the grains, further conduit means communicating said further pumping means with said lower portion of said pressing column, and a further whey discharge conduit communicating with said upper portion of said pressing column externally of said perforated tube, said decanting drum having a cross-sectional area greater than the cross-sectional area of the pressing column.

4. Apparatus according to claim 3, comprising a countercurrent washing column connected coaxially between the decanting drum and the pressing column and having a lower portion, and further including a feed pipe opening into said lower portion of said countercurrent washing column, a vertical shaft rotatably and coaxially supported in said washing column, and a variable speed motor driving said shaft, said shaft including impellers, said perforated tube having a diameter less than that of said countercurrent washing column.

References Cited
UNITED STATES PATENTS

| | | | |
|---|---|---|---|
| 2,781,269 | 2/1957 | Harper et al. | 99—116 |
| 3,044,863 | 7/1962 | Osborne et al. | 99—116X |
| 3,368,278 | 2/1968 | Opie | 99—116X |
| 3,438,131 | 4/1969 | Ubbels et al. | 99—116X |

LIONEL M. SHAPIRO, Primary Examiner

D. M. NAFF, Assistant Examiner

U.S. Cl. X.R.

31—89; 99—20, 116, 243